US009480082B2

(12) United States Patent
Diachina et al.

(10) Patent No.: US 9,480,082 B2
(45) Date of Patent: Oct. 25, 2016

(54) METHODS OF TRANSMITTING ACCESS REQUESTS USING REDUCED RESPONSE INTERVALS AND RELATED MOBILE STATIONS AND BASE STATION SUBSYSTEMS

(71) Applicant: TELEFONAKTIEBOLAGET L M ERICSSON (PUBL), Stockholm (SE)

(72) Inventors: John Walter Diachina, Garner, NC (US); Daniel Widell, Vikbolandet (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 62 days.

(21) Appl. No.: 13/765,378

(22) Filed: Feb. 12, 2013

(65) Prior Publication Data

US 2013/0215843 A1    Aug. 22, 2013

Related U.S. Application Data

(60) Provisional application No. 61/599,591, filed on Feb. 16, 2012.

(51) Int. Cl.
*H04L 1/00* (2006.01)
*H04W 74/00* (2009.01)
*H04W 74/08* (2009.01)

(52) U.S. Cl.
CPC ......... *H04W 74/00* (2013.01); *H04W 74/0833* (2013.01); *H04W 74/006* (2013.01); *H04W 74/08* (2013.01)

(58) Field of Classification Search
CPC ............ H04W 74/0833; H04W 74/06; H04L 1/1685
USPC ....................................................... 370/329
See application file for complete search history.

(56) References Cited

U.S. PATENT DOCUMENTS

| 2010/0081445 A1* | 4/2010 | Aghili ................... H04L 5/0053 455/450 |
| 2010/0220713 A1* | 9/2010 | Tynderfeldt et al. ......... 370/350 |
| 2011/0038361 A1* | 2/2011 | Park et al. .................... 370/350 |
| 2011/0317636 A1 | 12/2011 | Diachina et al. |

(Continued)

FOREIGN PATENT DOCUMENTS

| EP | 2 178 321 A1 | 4/2010 |
| WO | WO 2008/156315 A2 | 12/2008 |

(Continued)

OTHER PUBLICATIONS

3GPP: 3rd Generation Partnership Project: Technical Specification Group GSM/EDGE Radio Access Network; GERAN Improvements for Machine-Type Communications (MTC) Release 12; 3GPP TR 43.868 v12.0.0 (Nov. 2012).

(Continued)

*Primary Examiner* — Mark Rinehart
*Assistant Examiner* — Matthew Hopkins

(57) ABSTRACT

A method of operating a mobile station requesting uplink access from a base station subsystem includes transmitting a first access request to a base station subsystem, and looking for an assignment message matching the first access request from the base station subsystem during a response interval after transmitting the first access request. When an assignment message is not received during the response interval, a second access request is transmitted to the base station subsystem after expiration of a retransmission interval after transmitting the first access request, with the retransmission interval being longer than the response interval.

34 Claims, 10 Drawing Sheets

(56) References Cited

U.S. PATENT DOCUMENTS

| | | | |
|---|---|---|---|
| 2012/0093173 A1 | 4/2012 | Noh et al. | |
| 2012/0213071 A1* | 8/2012 | Jokinen et al. | 370/232 |
| 2013/0051336 A1* | 2/2013 | Li et al. | 370/329 |
| 2013/0070589 A1 | 3/2013 | Diachina et al. | |

FOREIGN PATENT DOCUMENTS

| | | |
|---|---|---|
| WO | WO 2011/159207 A1 | 12/2011 |
| WO | WO 2012/049604 A1 | 4/2012 |

OTHER PUBLICATIONS

Ericsson, St-Ericsson: "Energy Efficient AGCH Monitoring"; 3GPP TSG-GERAN #56; Prague, Czech Republic; Nov. 19-23, 2013.

3GPP: $3^{rd}$ Generation Partnership Project: Technical Specification Group GERAN; GERAN Improvements for Machine-Type Communications (MTC) Release 11; 3GPP TR 43.868 v0.5.0 (Nov. 2011).

Tdoc GP-130395, "Energy Efficient AGCH monitoring", 3GPP TSG Geran#58, Agenda item 7.2.5.3.6, May 13-17, 2013, Xiamen, China, the whole document.

Tdoc GP-130489, "Energy Efficient AGCH Monitoring", 3GPP TSG GERAN#58, Agenda item 7.2.5.3.6, May 13-17, 2013, Xiamen, China, the whole document.

Tdoc GP-130721, "Managing the Response Time Window", 3GPP TSG GERAN#59, Agenda item 7.2.5.3.6, Aug. 26-30, 2013, Sofia Bulgaria, the whole document.

3GPP TSG-GERAN #56, "Simulations for Optimized Matching Response", GP-121304, Ericsson, ST-Ericsson, Prague, Czech Republic, Nov. 19-23, 2012, the whole document.

\* cited by examiner

Figure 3

| Improved/ Optimized Matching Procedure (OMP) | Matching IA in TI 1 | Matching IA in TI 2 | Matching IA in TI 3 | Matching IA in TI 4 | Matching IA in TI 5 |
|---|---|---|---|---|---|
|  | MS looks for IA1 for up to 500ms | MS looks for IA2 for up to 500ms | MS looks for IA3 for up to 500ms | MS looks for IA4 for up to 500ms | MS looks for IA5 for up to 500ms |
| Legacy Matching Procedure (LMP) | MS looks for IA 1 for up to 549ms | MS looks for IA1 and IA2 for up to 503ms | MS looks for IA1, IA2 and IA3 for up to 549ms | MS looks for IA2, IA3 and IA4 for up to 591ms | MS looks for IA3, IA4 and IA5 for up to 1098ms |
| Cumulative processing time (in ms) spent looking for a matching IA message | OMP: 500 LMP: 549 | OMP: 500+ 500 = 1000 LMP: 549+ 503 = 1052 | OMP: 1000+ 500 = 1500 LMP: 1052+ 549 = 1601 | OMP: 1500+ 500 = 2000 LMP: 1601+ 591 = 2192 | OMP: 2000+ 500 = 2500 LMP: 2192+ 1098 = 3290 |
| OMP Processing Savings |  | 49/549 = 9% | 52/1052 = 5% | 101/1601 = 6.3% | 192/2192 = 8.7% | 790/3290 = 24% |

Processing Savings – 500ms BSS Response Time

Figure 4

|  | TI 1 | TI 2 | TI 3 | TI 4 | TI 5 |
|---|---|---|---|---|---|
| Number of non-BCCH radio blocks | (549/235)*10 *.9 = 21 | (503/235)*10 *.9 = 19 | (549/235)*10 *.9 = 21 | (591/235)*10 *.9 = 23 | (1098/235)* 10*.9 = 42 |
| Number of non-BCCH radio blocks read | OMP: (500/549)*21 = 19 LMP: 21 | OMP: 19 LMP: 19 | OMP: 19 LMP: 21 | OMP: 19 LMP: 23 | OMP: 19 LMP: 42 |
| Number of AGCH matching attempts | OMP: 19*.6 = 11.4 LMP: 21*.6*1 = 12.6 | OMP: 19*.6 = 11.4 LMP: 19*.6*2 = 22.8 | OMP: 19*.6 = 11.4 LMP: 21*.6*3 = 37.8 | OMP: 19*.6 = 11.4 LMP: 23*.6*3 = 41.4 | OMP: 19*.6 = 11.4 LMP: 42*.6*3 = 75.6 |
| Power Consumption | OMP: 19*5.2 + 11.4*.052 = 99.4 mWs  LMP: 21*5.2 + 12.6*.052 = 109.8 mWs | OMP: 99.4 mWs  LMP: 19*5.2 + 22.8*.052 = 100.0 mWs | OMP: 99.4 mWs  LMP: 21*5.2 + 37.8*.052 = 111.2 mWs | OMP: 99.4 mWs  LMP: 23*5.2 + 41.4*.052 = 121.7 mWs | OMP: 99.4 mWs  LMP: 42*5.2 + 75.6*.052 = 222.3 mWs |
| OMP Power Savings | 9.5% | 0.6% | 10.6% | 18.3% | 55.3% |

Power Savings – 500ms BSS Response Time

Figure 5

|  | TI 1 | TI 2 | TI 3 | TI 4 | TI 5 |
|---|---|---|---|---|---|
| Number of non-BCCH radio blocks | (549/235)*10 *.9 = 21 | (503/235)*10 *.9 = 19 | (549/235)*10 *.9 = 21 | (591/235)*10 *.9 = 23 | (1098/235)* 10*.9 = 42 |
| Number of non-BCCH radio blocks read | OMP: 12 LMP: 21 | OMP: 12 LMP: 19 | OMP: 12 LMP: 21 | OMP: 12 LMP: 23 | OMP: 12 LMP: 42 |
| Number of AGCH matching attempts | OMP: 12*.6 = 7.2 LMP: 21*.6*1= 12.6 | OMP: 12*.6 = 7.2 LMP: 19*.6*2= 22.8 | OMP: 12*.6 = 7.2 LMP: 21*.6*3= 37.8 | OMP: 12*.6 = 7.2 LMP: 23*.6*3= 41.4 | OMP: 12*.6 = 7.2 LMP: 42*.6*3= 75.6 |
| Power Consumption | OMP: 12*5.2 + 7.2*.052 = 62.8 mWs  LMP: 21*5.2 + 12.6*.052 = 109.8 mWs | OMP: 62.8 mWs  LMP: 19*5.2 + 22.8*.052 = 100.0 mWs | OMP: 62.8 mWs  LMP: 21*5.2 + 37.8*.052 = 111.2 mWs | OMP: 62.8 mWs  LMP: 23*5.2 + 41.4*.052 = 121.7 mWs | OMP: 62.8 mWs  LMP: 42*5.2 + 75.6*.052 = 222.3 mWs |
| OMP Power Savings | 42.8% | 37.2% | 43.5% | 48.4% | 71.7% |

Power Savings – 300ms BSS Response Time

Figure 6

|  | TI 1 | TI 2 | TI 3 | TI 4 | TI 5 |
|---|---|---|---|---|---|
| Number of non-BCCH radio blocks | (549/235)*10 *.9 = 21 | (503/235)*10 *.9 = 19 | (549/235)*10 *.9 = 21 | (591/235)*10 *.9 = 23 | (1098/235)* 10*.9 = 42 |
| Number of non-BCCH radio blocks read | OMP: 8<br>LMP: 21 | OMP: 8<br>LMP: 19 | OMP: 8<br>LMP: 21 | OMP: 8<br>LMP: 23 | OMP: 8<br>LMP: 42 |
| Number of AGCH matching attempts | OMP:<br>8*.6 = 4.8<br>LMP:<br>21*.6*1=<br>12.6 | OMP:<br>8*.6 = 4.8<br>LMP:<br>19*.6*2=<br>22.8 | OMP:<br>8*.6 = 4.8<br>LMP:<br>21*.6*3=<br>37.8 | OMP:<br>8*.6 = 4.8<br>LMP:<br>23*.6*3=<br>41.4 | OMP:<br>8*.6 = 4.8<br>LMP:<br>42*.6*3=<br>75.6 |
| Power Consumption | OMP:<br>8*5.2 +<br>4.8*.052 =<br>41.9 mWs<br>LMP:<br>21*5.2 +<br>12.6*.052 =<br>109.8 mWs | OMP:<br>41.9 mWs<br>LMP:<br>19*5.2 +<br>22.8*.052 =<br>100.0 mWs | OMP:<br>41.9 mWs<br>LMP:<br>21*5.2 +<br>37.8*.052 =<br>111.2 mWs | OMP:<br>41.9 mWs<br>LMP:<br>23*5.2 +<br>41.4*.052 =<br>121.7 mWs | OMP:<br>41.9 mWs<br>LMP:<br>42*5.2 +<br>75.6*.052 =<br>222.3 mWs |
| OMP Power Savings | 61.8% | 58.1% | 62.3% | 65.6% | 81.1% |

Power Savings – 200ms BSS Response Time

Figure 7A

| Worst case BSS Response Time | Match in TI 1 | Match in TI 2 | Match in TI 3 | Match in TI 4 | Match in TI 5 |
|---|---|---|---|---|---|
| 500 ms | 0% | 3.4% | 3.6% | 7.4% | 14.6% |
| 400 ms | 0% | 10.1% | 17.1% | 27.7% | 41.7% |
| 300 ms | 0% | 15.2% | 27.3% | 43% | 62.1% |
| 200 ms | 0% | 22% | 40.9% | 63.3% | 89.2% |

Summary of OMP Power Savings over 41040 Access Attempts

| Channel Coding | Match In TI-1 | Match In TI-2 | Match In TI-3 | Match In TI-4 | Match In TI-5 |
|---|---|---|---|---|---|
| CS-1 (30 RLC data blocks) | 0 % | 11.29 % | 17.96 % | 24.04 % | 29.49 % |
| MCS-7 (6 RLC data blocks) | 0 % | 30.3 % | 38.87 % | 44.87 % | 49.39 % |

Power Savings Per Small Data Transmission (STD) With a Worst Case BSS Response Time of 200 ms

US 9,480,082 B2

METHODS OF TRANSMITTING ACCESS REQUESTS USING REDUCED RESPONSE INTERVALS AND RELATED MOBILE STATIONS AND BASE STATION SUBSYSTEMS

CROSS REFERENCE TO RELATED APPLICATION

The present application claims the benefit of priority from U.S. Provisional Patent Application No. 61/599,591 filed Feb. 16, 2012, entitled "S, T and BSS Response Time Based MS Power Savings," the disclosure of which is hereby incorporated herein in its entirety by reference.

TECHNICAL FIELD

The present disclosure is directed to wireless communications and, more particularly, to network access methods and related mobile stations and base station subsystems.

BACKGROUND

In a typical cellular radio system, mobile stations (also referred to as user equipment unit nodes, UEs, and/or wireless terminals) communicate via a radio access network (RAN) with one or more core networks. The RAN covers a geographical area which is divided into cell areas, with each cell area being served by a base station subsystem (also referred to as a radio base station, base station, RAN node, a "NodeB", and/or enhanced NodeB "eNodeB"). A cell area is a geographical area where radio coverage is provided by the base station subsystem equipment at a base station subsystem site. The base station subsystems communicate through wireless radio communication channels with mobile stations within range of the base station subsystems.

A mobile station communicating with a base station subsystem transmits an access request over a random access channel when the mobile station has data for transmission to the base station subsystem, and responsive to the access request, the base station subsystem transmits an assignment message identifying uplink resources that have been allocated for the mobile station uplink data transmission(s). The base station subsystem, however, may not respond to a first access request transmitted by the mobile station, for example, in the following situations: (1) if there is a collision (i.e., interference) with another access request transmitted by another mobile station at the same time so that the first access request is not received by the base station subsystem; (2) if the mobile station is a relatively low priority mobile station so that the first access request is ignored in favor of requests from higher priority mobile stations; and (3) if the base station subsystem has insufficient resources to respond to all access requests (e.g., during a period of high traffic). Accordingly, a mobile station may need to transmit a number of access requests separated in time by respective retransmission intervals before receiving an assignment message identifying uplink resources for the uplink data transmission(s).

In situations where the mobile station transmits multiple access requests separated by retransmission intervals before receiving an assignment message, the mobile station is required to look (e.g., monitor or search) for an assignment message from the base station subsystem during the retransmission intervals between transmitting the multiple access requests. These extended monitoring periods over the retransmission intervals may result in consumption of processing resources at the mobile station, consumption of power at the mobile station, and/or reduction of mobile station battery life.

SUMMARY

It may therefore be an object to address at least some of the above mentioned disadvantages and/or to improve performance in a wireless communication system. Some embodiments of present inventive concepts, for example, may reduce power consumption at the mobile station, reduce consumption of processing resources at the mobile station, and/or increase battery life at the mobile station.

According to first embodiments disclosed herein, a method of operating a mobile station requesting uplink access from a base station subsystem includes transmitting a first access request to a base station subsystem. During a response interval after transmitting the first access request, the mobile station looks for an assignment message transmitted from the base station subsystem and matching the first access request. After expiration of a retransmission interval after transmitting the first access request, a second access request is transmitted to the base station subsystem, with the retransmission interval being longer than the response interval. More particularly, looking for an assignment message matching the first access request is terminated after expiration of the response interval and before expiration of the retransmission interval. By providing a response interval that is less than the retransmission interval between transmissions/retransmissions of access requests for an access attempt, the mobile terminal is not required to look for a matching assignment message during the full time between access requests for an access attempt. Accordingly, power consumption and/or processing overhead may be reduced at the mobile station, and/or battery life at the mobile station may be increased.

According to some aspects of the first embodiments, the response interval is a first response interval, and the retransmission interval is a first retransmission interval. In addition, the mobile station looks for an assignment message matching the second access request from the base station subsystem during a second response interval after transmitting the second access request responsive to failure to receive an assignment message matching the first access request during the first response interval. The mobile station transmits a third access request to the base station subsystem after expiration of a second retransmission interval after transmitting the second access request responsive to failure to receive an assignment message matching the second access request during the second response interval, with the second retransmission interval being longer than the second response interval.

According to some aspects of the first embodiments, looking for an assignment message during the second response interval after transmitting the second access request includes looking for an assignment message matching only the second access request. For example, the first access request may include a first bit sequence, the second access request may include a second bit sequence different than the first bit sequence, and looking for an assignment message during the second response interval after transmitting the second access request may include looking for an assignment message matching the second bit sequence of the second access request without looking for an assignment message matching the first bit sequence. By looking for an assignment message matching only a most recent access request, mobile station processing overhead and/or power consumption may be reduced.

According to some aspects of the first embodiments, the first and second response intervals have a same duration. More particularly, an indication of a response time may be received from the base station subsystem, with a duration of the response intervals being based on the indication of the response time received from the base station subsystem. Moreover, the indication of the response time may include an indication of a worst case response time. By providing that the response intervals are as long as the base station worst case response time, mobile station processing overhead and power consumption may be reduced without significantly increasing a risk of missing an assignment message transmitted by the base station subsystem.

According to some more aspects of the first embodiments, the second access request is transmitted to the base station subsystem responsive to failure to receive an assignment message matching the first access request during the first response interval. In addition, when an assignment message is received from the base station subsystem matching the second access request after transmitting the second access request a packet switched communication is transmitted to the base station subsystem responsive to receiving the assignment message.

According to second embodiments disclosed herein, a method of operating a mobile station requesting uplink access from a base station subsystem includes transmitting a first access request to a base station subsystem. During a first response interval after transmitting the first access request, the mobile station looks for an assignment message transmitted from the base station subsystem and matching the first access request. The mobile station transmits a second access request to the base station subsystem responsive to failure to receive an assignment message matching the first access request during the first response interval. During a second response interval after transmitting the second access request, the mobile station looks for an assignment message transmitted from the base station subsystem and matching only the second access request. By looking for an assignment message matching only the second access request during, the second response interval (without looking for an assignment message matching the first access request), power consumption and/or processing overhead may be reduced at the mobile station, and/or battery life at the mobile station may be increased.

According to some aspects of the second embodiments, looking for an assignment message matching the first access request includes looking for an assignment message matching the first access request only during the first response interval, transmitting the second access request includes transmitting the second access request after expiration of a retransmission interval after transmitting the first access request, and the retransmission interval is longer than the first response interval. As discussed above, by providing a response interval that is less than the retransmission interval between transmissions/retransmissions of access requests for an access attempt, the mobile terminal is not required to look for a matching assignment message during the full time between access requests for an access attempt. Accordingly, power consumption and/or processing overhead may be reduced at the mobile station, and/or battery life at the mobile station may be increased.

According to third embodiments disclosed herein, a method of operating a base station subsystem includes determining a response time defining a period within which an assignment message will be transmitted responsive to an access request received from mobile station, and transmitting an indication of the response time to the mobile station. By providing information regarding the response time to the mobile station, the mobile station may reduce time spent looking for assignment messages during an access attempt thereby reducing mobile station power consumption, reducing mobile station processing overhead, and/or increasing mobile station battery life.

According to some aspects of the third embodiments, the response time includes an indication of a worst case response time. Moreover, transmitting the indication of the response time includes transmitting the indication of the response time on a broadcast control channel, and/or determining the response time includes determining the response time responsive to current communications traffic. By providing that mobile station response intervals are as long as the base station worst case response time, mobile station processing overhead and power consumption may be reduced without significantly increasing a risk of a mobile station missing an assignment message transmitted by the base station subsystem.

According to fourth embodiments disclosed herein, a mobile station includes a transceiver configured to provide wireless communication with a base station subsystem of a radio access network, and a processor coupled to the transceiver. The processor is configured to transmit a first access request through the transceiver to the base station subsystem, to look for an assignment message transmitted from the base station subsystem and matching the first access request during a response interval after transmitting the first access request, and to transmit a second access request through the transceiver to the base station subsystem after expiration of a retransmission interval after transmitting the first access request. Moreover, the retransmission interval is longer than the response interval.

According to fifth embodiment disclosed herein, a base station subsystem in a radio access network includes a transceiver configured to provide wireless communication with a mobile station, and a processor coupled to the transceiver. The processor is configured determine a response time defining a period within which an assignment message will be transmitted responsive to an access request received from the mobile station, and to transmit an indication of the response time through the transceiver to the mobile station.

BRIEF DESCRIPTION OF THE DRAWINGS

The accompanying drawings, which are included to provide a further understanding of the disclosure and are incorporated in and constitute a part of this application, illustrate certain non-limiting embodiment(s) of inventive concepts. In the drawings:

FIGS. 3, 4, 5, 6, 7A, and 7B are tables illustrating possible savings of processing time and/or power consumption using different base station subsystem response times according to some embodiments;

FIG. 8 is a block diagram of a communication system that is configured according to some embodiments;

DETAILED DESCRIPTION

Figures 1, 2:
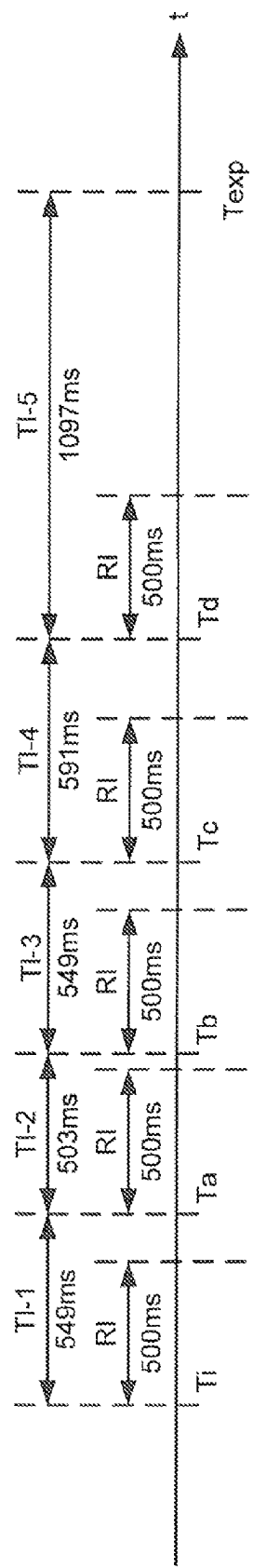
FIG. 1 is a table illustrating values of a parameter S corresponding to possible values of a parameter T (Tx-Integer) according to some embodiments.
FIG. 2 is a timing diagram illustrating retransmission intervals (also referred to as time intervals and/or transmission intervals) and response intervals according to some embodiments.

Inventive concepts will now be described more fully hereinafter with reference to the accompanying drawings, in which examples of embodiments of inventive concepts are shown. These inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

For purposes of illustration and explanation only, these and other embodiments of present inventive concepts are described herein in the context of operating in a RAN that communicates over radio communication channels with mobile stations (also referred to as wireless terminals or UEs). It will be understood, however, that present inventive concepts are not limited to such embodiments and may be embodied generally in any type of communication network. As used herein, a mobile station (also referred to as a wireless terminal or UE) can include any device that receives data from a communication network, and may include, but is not limited to, a mobile telephone ("cellular" telephone), laptop/portable computer, pocket computer, hand-held computer, desktop computer, and/or a machine-type communications (MTC) device.

In some embodiments of a RAN, several base station subsystems can be connected (e.g., by landline or radio channels) to a radio network controller (RNC). The radio network controller, also sometimes termed a base station controller (BSC), supervises and coordinates various activities of the plural base station subsystems connected thereto. The radio network controller is typically connected to one or more core networks.

General Packet Radio Service (GPRS) Enhanced Data Rates for the Global System for Mobile Communications (EDGE) Radio Access Networks (also referred to as GER-ANs) evolved from the Global System for Mobile Communications (GSM). Note that although terminology from 3GPP (3$^{rd}$ Generation Partnership Project) GERAN is used in this disclosure to exemplify embodiments of inventive concepts, this should not be seen as limiting the scope of inventive concepts to only these systems. Other wireless systems, including LTE (Long Term Evolution), WCDMA (Wideband Code Division Multiple Access), WiMax (Worldwide interoperability for Microwave Access), UMB (Ultra Mobile Broadband), HSDPA (High-Speed Downlink Packet Access), GSM (Global System for Mobile Communications), etc., may also benefit from exploiting embodiments of present inventive concepts disclosed herein.

Also note that terminology such as base station subsystem (e.g., BSS, base station, NodeB, eNodeB, or Evolved Node B) and mobile station (e.g., MS, wireless terminal, UE, or User Equipment) should be considering non-limiting and does not imply a certain hierarchical relation between the two. In general, a base station subsystem (e.g., a BSS) and a mobile station (e.g., an MS) are considered as examples of respective different communications devices that communicate with each other over a wireless radio channel. While embodiments discussed herein focus on wireless transmissions in an uplink from a mobile station MS to a base station subsystem BSS, embodiments of inventive concepts can also be applied, for example, in the downlink.

Figures 7B, 8:
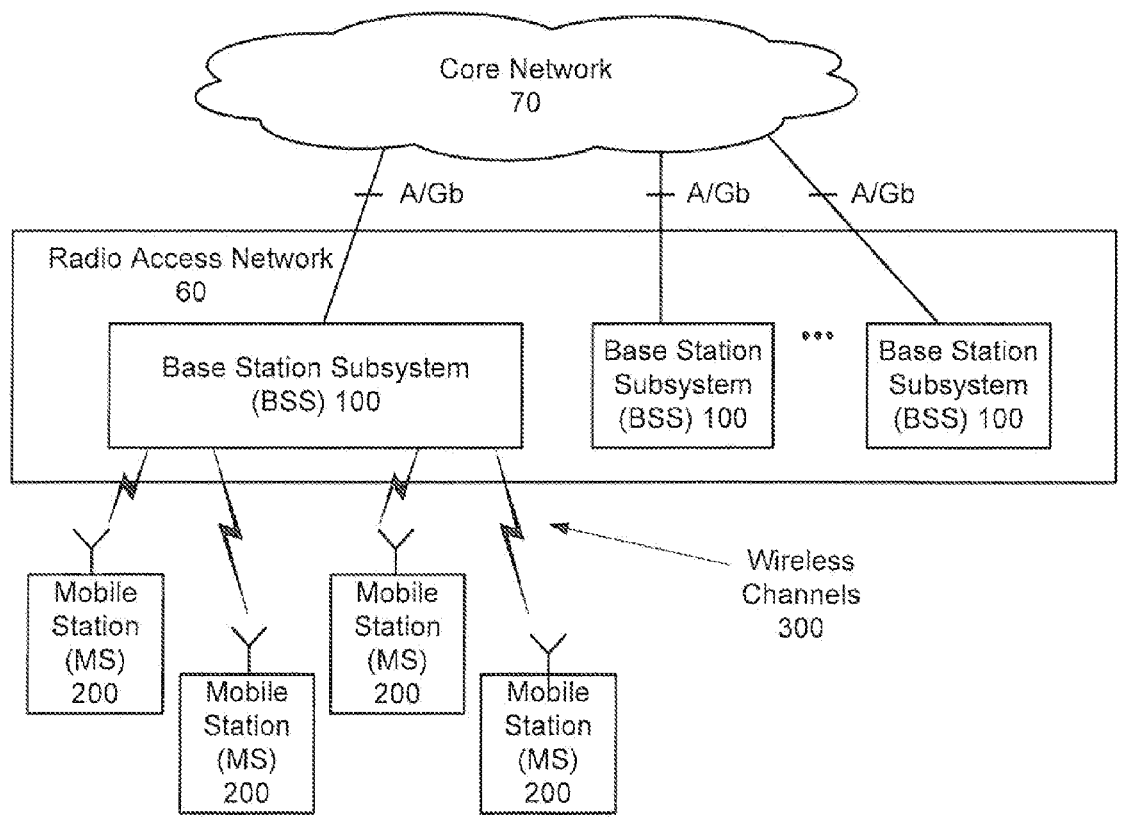

FIG. 8 is a block diagram of a communication system that is configured to operate according to some embodiments of present inventive concepts. An example RAN 60 is shown that can be a GERAN. Radio base station subsystems BSSs 100 can be connected directly to one or more core networks 70. Radio base station subsystems 100 communicate over wireless channels 300 with mobile stations MSs (also referred to as wireless terminals, user equipment nodes, or UEs) 200 that are within their respective communication service cells (also referred to as coverage areas). The radio base station subsystems (BSSs) 100 can communicate with one another and/or with the core network(s) 70 through A/Gb interfaces, as is well known to one who is skilled in the art.

Figure 9:
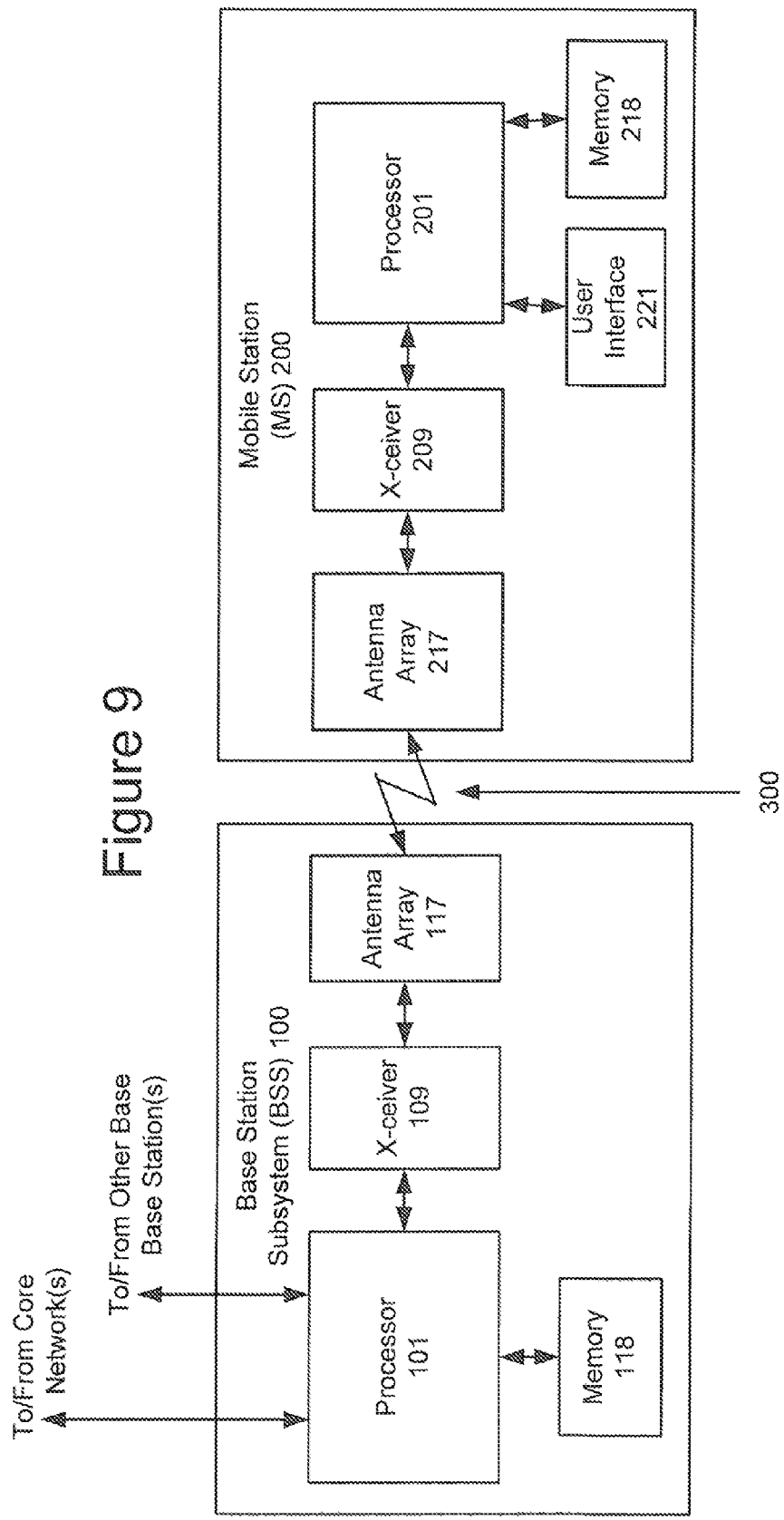
FIG. 9 is a block diagram illustrating a base station subsystem BSS and a mobile station MS according to some embodiments of FIG. 8.

FIG. 9 is a block diagram of a base station subsystem BSS 100 and a mobile station MS 200 of FIG. 8 in communication over wireless channel 300 according to some embodiments of present inventive concepts. As shown, base station subsystem 100 can include transceiver 109 coupled between processor 101 and antenna 117 (e.g., including an array of multiple antennas), and memory 118 coupled to processor 101. Moreover, mobile station MS 200 can include transceiver 209 coupled between antenna 217 and processor 201, and user interface 221 coupled to processor 201, and memory 218 coupled to processor 201. Accordingly, base station processor 101 transmits communications through transceiver 109 and antenna 117 for reception at mobile station processor 201 through antenna 217 and transceiver 209. In the other direction, mobile station processor 201 transmits communications through transceiver 209 and antenna 217 for reception at base station processor 101 through antenna 117 and transceiver 109. To support MIMO (allowing parallel transmission of multiple layers/streams of data using a same TFRE), each of antennas 117 and 217 can include an array of antenna elements. Mobile station 200 of FIG. 9, for example, may be a cellular radiotelephone, a smart phone, a laptop/netbook/tablet/handheld computer, a machine-type communications (MTC) device, or any other device providing wireless communications. User interface 211, for example, may include a visual display such as a liquid crystal display, a touch sensitive visual display, a keypad, a speaker, a microphone, etc. While user interface 221 is shown by way of example, mobile station MS 200 may not include a user interface, for example, if mobile station MS 200 is an MTC device, such as a remote sensor.

Considering mechanisms used when a mobile station MS attempts to detect a matching assignment message on the AGCH (Access Grant Channel) in response to a channel access request (also referred to as a channel request) sent on the RACH (Random Access Channel), power savings can be realized by modifying the way in which the mobile station MS monitors the AGCH while looking (e.g., monitoring, searching, etc.) for a matching assignment message. Improved battery life may be desirable, for example, in the following cases:

For remote devices that have no external power supply where increasing/maximizing connectivity time through extended battery life can be critical/important/desirable.

For networks that prefer to down prioritize access requests received from Machine-Type-Communication MTC devices (configured for Low Access Priority) during periods of CCCH congestion.

For devices that frequently experience less than nominal coverage or congestion such that a given access attempt often results in the transmission of multiple access requests.

For devices that have access to an external power supply where reducing/minimizing the frequency of battery recharge improves overall end-user experience.

An analysis of procedures for access request and response matching that takes into account values for S and T along with different worst case BSS response times is performed to reduce power consumption and/or increase mobile station battery life. T is the value of the parameter "Tx-integer" broadcast on the Broadcast Control Channel BCCH (see the first column in the table of FIG. 1) and M is the value of the parameter "max retrans" (maximum number of retransmissions) broadcast on the BCCH (i.e., where M=1, 2, 4 or 7). S is a parameter depending on the CCCH configuration and on the value of Tx-integer as defined in the third column of the table of FIG. 1.

Optimized/improved system access procedure (OSAP) is a mechanism that can enhance/improve AGCH (Access Grant Channel) capacity. According to the OSAP system access procedure, the amount of MS (Mobile Station) specific information within an assignment message sent on the AGCH can be reduced/minimized by using new BCCH (Broadcast Control Channel) information and PACCH (Packet Associated Control Channel) signaling to provide supplemental information needed for uplink TBF (Temporary Block Flow) establishment. In addition, further consideration is given to the part of the OSAP system access procedure wherein an MS attempts to match an Enhanced Immediate Assignment (EIA) message sent by the BSS (Base Station Subsystem, also referred to as a Base station) on the AGCH to an Enhanced Packet Channel Request (EPCR) message sent on the RACH.

An MS attempting an OSAP based system access first schedules the transmission of EPCR channel request messages and then sends up to M+1 EPCR packet channel request messages on the RACH (Random Access Channel) in a way such that:

When requesting resources for a PS (Packet Switched) connection other than in the case of sending a paging response, the mobile station sends the first EPCR packet channel request message in the first available TDMA frame belonging to the mobile station's RACH.

In all other cases, the number of slots belonging to the mobile station's RACH between initiation of the OSAP system access procedure and the first EPCR packet channel request message (excluding the slot containing the message itself) is a random value drawn randomly for each new initial assignment initiation with uniform probability distribution in the set {0, 1, ... , max (T,8)−1}.

The number of slots belonging to the mobile station's RACH between two successive EPCR packet channel request messages (excluding the slots containing the messages themselves) is a random value drawn randomly for each new transmission with uniform probability distribution in the set {S, S+1, ... , S+T−1}.

T is the value of the parameter "Tx-integer" broadcast on the BCCH (see the table of FIG. 1) and M is the value of the parameter "max retrans" (or maximum number of retransmissions) broadcast on the BCCH (i.e. where M=1, 2, 4 or 7). S is a parameter depending on the CCCH (Common Control Channel) configuration and on the value of Tx-integer as defined in the table of FIG. 1.

After sending the first EPCR enhanced packet channel request message, the mobile station MS starts listening to the full downlink CCCH timeslot corresponding to its CCCH group in an attempt to find a matching ETA (Enhanced Immediate Assignment) message corresponding to one of its last 3 transmitted EPCR enhanced packet channel request messages.

Having sent M+1 EPCR packet channel request messages (i.e. the maximum allowed), the RR (Round-Robin scheduler) entity of the mobile station starts timer T3126.

The minimum value of T3126 can be equal to the time taken by T+2S slots of the mobile station's RACH (see the table of FIG. 1 for the values of and T) with the maximum allowed value of this timer being limited to 5 seconds.

At expiry of timer T3126, the OSAP system access procedure is be aborted. If the OSAP system access procedure was triggered by a request from the MM (mobility management) sublayer, a random access failure is indicated to the MM sublayer.

Upon finding a matching EIA message at any time (i.e., regardless of whether the maximum number of EPCR packet channel request messages have been sent and prior to the expiration of T3126 if running), the mobile station MS acts on the matching EIA message and proceeds with its OSAP based system access in which case it stops looking for additional EIA messages on the AGCH.

CCCH (Common Control Channel) configuration attributes and parameters considered in some embodiments disclosed herein include:

S=109, TX-integer (T)=20 (as per Table 5 of 3GGP TR 43.868, V12.0.0, 2012-11, entitled "GERAN improvements For Machine-Type Communications," the disclosure of which is hereby incorporated herein in its entirety by reference), Max retrans (M)=4, (S)=109, and each transmitted access request is an EPCR packet channel request message that includes 8 random bits.

One uplink slot per TDMA (Time Division Multiple Access) frame has been assigned as the RACH (i.e., the CCCH uplink consists only of RACH bursts that occur once every TDMA frame=4.615 ms).

8 bits of FN (Frame Number) information is provided for each mobile station MS addressed by an EIA (Enhanced immediate Assignment) message sent on the AGCH. This means that any instance of FN Information provided by an EIA message will reflect TDMA frames occurring at 1.18 sec intervals (i.e., the 8 least significant bits of the TDMA frame number repeat every 256*4.615 ms=1.18 sec).

Even though a mobile station MS only treats an assignment message with matching FN information as valid if it addresses one of its last 3 access attempts, the mobile station may not know how delayed any given EIA message is (i.e., the mobile station may not know the worst case BSS response time for ara EPCR packet channel request message on the RACH). For this example, a worst case BSS response time of 500 ms has been assumed.

According to OSAP system access procedures, the MS only considers an EIA message as a potentially matching assignment message if it corresponds to one of its last 3 transmitted EPCR packet channel request messages. In other words, when attempting to determine if it has received a potentially matching assignment message, a mobile station MS only compares the FN Information received in any given ETA message to the 8 least significant bits of the TDMA frame number associated with its last 3 transmitted EPCR packet channel request messages.

Timer T3126 (started after sending the maximum allowed number of EPCR packet channel request messages) can have a duration equal to (T+2S) TDMA frames (where 1 TDMA frame=4.61 ins) up to a maximum of 5 seconds.

The initial access request (EPCR packet channel request message) of a given system access attempt is sent on the RACH at time t=Ti and is followed by 4 additional access requests (EPCR packet channel requests) sent using RACH slots that are randomly spaced in the range {S, S+1, . . . , S+T−1}={109, 110 . . . 128} TDMA frames apart.

The minimum spacing between two successive access requests is therefore 109 TMDA frames (503 ms), the maximum spacing is 128 TDMA frames (591 ms), and an average spacing is 119 TDMA frames (549 ms).

For this example, the 2nd access request is sent at time t=Ta (Ti+549 ms), the 3rd access request is sent at time t=Tb (Ta+503 ms), the 4th access request is sent at time t=Tc (Tb+549 ms), and the $5^{th}$ (and final) access request is sent at time t=Td (Tc+591 ms) as shown in FIG. 2.

After transmitting the last access request at t=Td the mobile station MS continues to look (e.g., monitor, search, etc.) for matching assignment messages corresponding to one of its last 3 access requests for 120 TDMA frames (T+2S=238 TDMA frames=1098 ms) according to the definition of timer T3126.

Note that regardless of the retransmission interval in which mobile station MS1 looks (e.g., monitors, searches, etc.) for a matching immediate assignment (IA) message, the probability of collision between two mobile stations attempting system access using the same request reference information at the same time (i.e. using the same RACH burst) may be considered to be negligible. Stated in other words, the probability is very low that two mobile stations both send a channel request with the same FN information (i.e., using the same RACH burst such that the value for FN modulo X is the same) and the same random access information (i.e., they select the same random bits for inclusion within the identifying bit sequence comprising the EPCR message), where X is set to reflect an acceptable probability for TDMA (Time Division Multiple Access) frame number collision. For example, for X=256, the time between uplink bursts for which FN mod 256 has the same value is 1.18 seconds (i.e., each TDMA frame=4.615 ms, 256*4.516 ms=1.18 seconds).

According to legacy operations, a mobile station MS only treats a matching immediate assignment (IA) message as valid if it matches one of its last three access attempts because the mobile station MS does not know how delayed any given IA message is because the mobile station MS does not know a worst case BSS response time for channel request messages on the RACH random access channel. Assuming a worst case BSS response time of 500 ms and considering the 5 retransmission intervals shown in FIG. 2, the retransmission intervals of FIG. 2 apply as discussed below.

Retransmission interval 1 TI-1 (also referred to as time interval 1) is the retransmission interval starting at time t=Ti when mobile station MS1 sends its initial access request and ending just before it sends its 2nd access request at time t=Ta (i.e., a 549 ms interval).

Since a worst case BSS response time of 500 ms has been assumed, an assignment message received in Retransmission interval 1 (TI-1) only reflects an access request sent at time t=Ti (i.e., it cannot also potentially reflect an access request sent at t=Ti−1.18 which would have the same 8 LSBs or Least Significant Bits of the TDMA frame sent at t=Ti). Accordingly, mobile station MS1 only needs to consider the first 500 ms of Retransmission interval 1 (TI-1) when looking (e.g., monitoring, searching, etc.) for an IA message that matches the initial access request sent at time t=Ti.

As such, a collision may occur only as a result of mobile station MS1 and another mobile station MS sending the same access request at time t=Ti. Based on using 8 Random bits within an EPCR packet channel request message sent at t=Ti, the probability of collision (PoC) occurring for a matching assignment message received in Retransmission interval 1 (TI-1) is therefore be PoCi=1/256.

Retransmission interval 2 TI-2 (also referred to as time interval 2) is the retransmission interval starting at time t=Ta when MS1 sends its $2^{nd}$ access request and ending just before it sends its $3^{rd}$ access request at time t=Tb (i.e. a 503 ms interval):

Since a worst case BSS response time of 500 ms has been assumed, an assignment message received in Retransmission interval 2 (TI-2) only reflects an access request sent at time t=Ta. Accordingly, mobile station MS1 only needs to consider Retransmission interval 2 (TI-2) when looking (e.g., monitoring, searching, etc.) for an IA message that matches the second access request sent at time t=Ta (i.e., mobile station MS1 does not need to look/monitor/search for an IA message matching the first access request sent at time t=Ti).

As such, a collision can occur as a result of mobile station MS1 and another mobile station MS sending the same access request at time t=Ta. Based on using 8 Random bits within an EPCR packet channel request message sent at t=Ta, the probability of collision (PoC) occurring for a matching assignment message received in Retransmission interval 2 (TI-2) is therefore PoCa=1/256.

Note that in the Retransmission interval 2 (TI-2), the MS still looks (e.g., monitors, searches, etc.) for an assignment message sent in response to its initial access request (i.e., even though the corresponding 500 ms BSS response time has expired) since, according to the specifications, it will be looking (e.g., monitoring, searching, etc.) for a response to any of its last 3 transmitted access request messages.

Retransmission interval 3 TI-3 (also referred to as time interval 3) is the retransmission interval starting at time t=Tb when mobile station MS1 sends its $3^{rd}$ access request and ending just before it sends its $4^{th}$ access request at time t=Tc (i.e., a 549 ms interval):

Since a worst case BSS response time of 500 ms has been assumed, an assignment message received in Retransmission interval 3 (TI-3) only reflects an access request sent at time t=Tb. Accordingly, mobile station MS1 only needs to consider the first 500 ms of Retransmission interval 3 (TI-3) when looking (e.g., monitoring, searching, etc.) for an IA message that matches the access request sent at time t=Tb (i.e., mobile station MS1 does not need to look for an IA message matching the access request sent at time t=Ti or the access request sent at time t=Ta).

As such, a collision can occur as a result of mobile station MS1 and another mobile station MS sending the same access request at time t=Tb. Based on using 8 Random bits within an EPCR packet channel request message sent at t=Tb, the probability of collision (PoC) occurring for a matching assignment message received in Retransmission interval 3 (TI-3) is therefore PoCb=1/256.

Note that in the Retransmission interval 3 (TI-3) the MS still looks (e.g., monitors, searches, etc.) for an assignment message sent in response to its initial access request or second access request (i.e., even though the corresponding 500 ms BSS response times have expired) since, according to the specifications, it will be looking (e.g., monitoring, searching, etc.) for a response to any of its last 3 transmitted access request messages.

Retransmission interval 4 TI-4 (also referred to as time interval 4) is the retransmission interval starting at time t=Tc when mobile station MS1 has sent its $4^{th}$ access request and ending just before it sends its $5^{th}$ access request at time t=Td (i.e. a 591 ms interval):

Since a worst case BSS response time of 500 ms has been assumed, an assignment message received in Retransmission interval 4 (TI-4) can only reflect an access request sent at time t=Tc. Accordingly, mobile station MS1 only needs to consider the first 500 ins of Retransmission interval TI-4 when looking (e.g., monitoring, searching, etc.) for an IA message that matches the access request sent at time t=Tc (i.e., mobile station MS1 does not need to look (e.g., monitor, search, etc.) for an IA message matching the access request sent at time t=Ti the access request sent at time t=Ta, or the access request sent at time t=Tb).

As such, a collision can occur as a result of mobile station MS1 and another mobile station MS sending the same access request at time t=Tc. Based on using 8 Random bits within an EPCR packet channel request message sent at t=Tc, the probability of collision (PoC) occurring for a matching assignment message received in Retransmission interval 4 (TI-4) is therefore PoCc=1/256.

Note that in the Retransmission interval 4 (TI-4) the mobile station MS1 still looks (e.g., monitors, searches, etc.) for an assignment message sent in response to its second or third access request (i.e. even though the corresponding 500 ms BSS response times have expired) since, according to the specifications, it will be looking monitoring, searching, etc.) for a response to any of its last 3 transmitted access request messages.

Retransmission interval 5 TI-5 (also referred to as time interval 5) is the retransmission interval starting when mobile station MS1 has sent its $5^{th}$ access request at time t=Td (at which point time T3126 starts) and ending when timer T3126 expires at time t=Texp (i.e. a 1098 ms interval):

Since a worst case BSS response time of 500 ms has been assumed, an assignment message received in Retransmission interval 5 (TI-5) can only reflect an access request sent at time t=Td. Accordingly, mobile station MS1 only needs to consider the first 500 ms of Retransmission interval 5 (TI-5) when looking (e.g., monitoring, searching etc.) for an IA messages that matches the access request sent at time t=Id (i.e., mobile station MS1 does not need to look (e.g., monitor, search, etc.) for an IA message matching the access request sent at time t=Ti, the access request sent at time t=Ta, the access request sent at time t=Tb, or the access request sent at nine t=Tc).

As such, a collision can occur as a result of mobile station MS1 and another mobile station MS sending the same access request at time t=Td. Based on using 8 Random hits within an EPCR packet channel request message sent at t=Td, the probability of collision (PoC) occurring for a matching assignment message received in Retransmission interval 5 (TI-5) is therefore PoCd=1/256.

Note that in the Retransmission interval 5 (TI-5), the mobile station MS still looks (e.g., monitor, search, etc.) for an assignment message sent in response to its third or fourth access request (i.e. even though the corresponding 500 ms BSS response times have expired) since, according to the specifications, it will be looking (e.g., monitoring, searching, etc.) for a response to any of its last 3 transmitted access request messages.

In light of the example discussed above with respect to FIG. 2, a mobile station that attempts system access using OSAP system access procedures can potentially reduce power consumption by only looking (e.g., monitoring, searching, etc.) for an assignment message that matches its most recently transmitted access request (without looking, monitoring, and/or searching for assignment messages matching a plurality of previously transmitted access requests) within a limited retransmission interval immediately following that most recently transmitted access request.

For example, if system information indicates a maximum BSS response time of 500 ms applies, the mobile station MS only looks (e.g., monitor, search, etc.) for a matching assignment message for 500 ms after sending any given access request.

With greater real time performance of a base station subsystem BSS, lower values for the maximum BSS response time may be indicated in system information so that the mobile station MS spends less time looking (e.g., monitoring, searching etc.) for a matching assignment message after sending any given access request, resulting in the potential for reduced mobile station MS power consumption.

For the case where system information indicates a maximum BSS response time of 250 ms, for example, the amount of time a mobile station MS spends looking (e.g., monitoring, searching, etc.) for a matching assignment message is reduced to about half of that required for a 500 ms maximum BSS response time. As such, allowing system information to indicate the maximum BSS response time may be beneficial in that it leads to substantial mobile station MS power savings (e.g., for the case where the first access request is missed by the BSS but it receives the second access request).

A mobile station can reduce power consumption by only looking (e.g., monitoring, searching, etc.) for a matching IA message corresponding to its most recently transmitted access request within a time window determined by a worst case BSS response time (provided by the base station subsystem BSS).

This power savings feature can be used when system information (provided by the base station subsystem BSS) indicates such a worst case BSS response time. In the absence of a worst case BSS response time provided by the base station subsystem BSS, mobile station MS1 may look (e.g., monitor, search, etc.) for IA messages corresponding to a plurality (e.g., up to three) of the most recently transmitted access requests over the entirety of each of the retransmission intervals TI-1, TI-2, TI-3, TI-4, and TI-5.

Considering that maximum base station subsystem BSS response times can vary between different equipment vendors and that substantial mobile station MS power savings are possible based on this maximum response time, system information can be enhanced to allow indication of the maximum (worst case) BSS response time (i.e., independent of whether or not the BSS supports OSAP). More specifically, for the case where system information indicates the maximum (worst case) BSS response time and the S and T values applicable for a given system configuration result in the spacing of access request messages that exceed the maximum BSS response time, the following mobile station MS power savings enhancements can be supported:

A mobile station MS only looks (e.g., monitors, searches, etc.) for an assignment message that matches its last transmitted access request (i.e., instead of supporting legacy operation whereby an MS looks/monitors/searches for an assignment message matching any of its last 3 transmitted access requests).

A mobile station MS makes use of the indicated maximum (worst case) BSS response to determine how long to look (e.g., monitor, search, etc.) for a matching assignment message following the transmission of any given access request.

A mobile station MS that takes into account the worst case (maximum) base station subsystem BSS response time when looking (e.g., monitoring, searching, etc.) for a matching immediate assignment (IA) message on a per retransmission interval (TI) basis as described above can experience a processing savings (compared to the legacy matching procedure LMP) as shown by the improved/optimized matching procedure OMP in the table of FIG. 3.

To provide an example of power savings that can be possible (based on simulations) according to FIG. 3, the following assumptions are made:

A mobile station has a 950 mAh 3.7 V battery having a total battery capacity of 3515 mWh;

Attempting to recover an immediate Assignment message from a radio block received on the AGCH consumes 5.2 mWs;

Each instance of attempting to match the contents of a recovered Immediate Assignment message to a previously transmitted Channel Request consumes 0.052 mWs;

60% of the radio blocks received during any of the retransmission intervals indicated in FIG. 1 contain an Immediate Assignment message; and An uplink TBF establishment scenario is assumed whereby a new access is attempted every 10 seconds for a given time period T (e.g. for T=114 hours the total access attempts=(114*60*60)/10=41040).

Using these assumptions, different worst case base station subsystem BSS response times are considered along with the specific response interval (RI) in which mobile station MS detects a matching assignment message on the AGCH. The corresponding power savings that can be realized using a matching procedure according to some embodiments of inventive concepts for these scenarios are as shown in the tables of FIGS. 4, 5, and 6 and a summary of savings using matching procedures according to some embodiments of inventive concepts is shown in the table of FIG. 7A.

Case 1—500 ms Worst Case BSS Response Time

The table of FIG. 4 illustrates examples of simulated power savings using a matching procedure according to some embodiments disclosed herein with a worst case base BSS response time of 500 ms.

Assuming that each access attempt results in the mobile station MS detecting a matching Immediate Assignment message within the first 500 ms of retransmission interval 1 TI-1, no power sayings are realized by the MS as shown in FIG. 7A.

Assuming each access attempt results in the mobile station MS detecting a matching Immediate Assignment message within the first 500 ms of retransmission interval 2 TI-2, power savings realized using the a matching procedure according to some embodiments disclosed herein are then 41040*[(109.8−99.4)+(99.4−99.4)]=41040*[10.4+0]=426816 mWs≈118.6 mWh which is about 3.4% of the entire battery capacity, as shown in FIG. 7A.

Assuming each access attempt results in the mobile station MS detecting a matching Immediate Assignment message within the first 500 ms of retransmission interval 3, power savings realized using a matching procedure according to some embodiments disclosed herein are then 41040*[(109.8−99.4)+(100.0−99.4)+(99.4−99.4)]=41040*[10.4+0.6+0]=451440 mWs≈125.4 mWh which is about 3.6% of the entire battery capacity, as shown in FIG. 7A.

Case 2—300 ms Worst Case BSS Response Time

The table of FIG. 5 illustrates examples of simulated power savings using a worst case BSS Response time of 300 ms.

Assuming each access attempt results in the mobile station MS detecting a matching Immediate Assignment message within the first 300 ms of retransmission interval 1 TI-1, no power savings are realized by the mobile MS as shown in FIG. 7A.

Assuming each access attempt results in the mobile station MS detecting a matching Immediate Assignment message within the first 300 ms of retransmission interval 2 TI-2, the power savings realized using a matching procedure according to some embodiments disclosed herein are then 41040*[(109.8−62.8)+(62.8−62.8)]=41040*[47.0+0]= 1928880 mWs≈535.8 mWh which is about 15.2% of the entire battery capacity as shown in FIG. 7A.

Assuming each access attempt results in the mobile station MS detecting a matching Immediate Assignment message within the first 300 ms of retransmission interval 3 TI-3, the power savings realized using a matching procedure according to some embodiments disclosed herein are then 41040*[(109.8−62.8)+(100.0−62.8)+(62.8−62.8)]=41040*[47.0+37.2+0]= 3455568 mWs≈959.9 mWh which is about 27.3% of the entire battery capacity as shown in FIG. 7A.

Case 3—200 ms Worst Case BSS Response Time

The table of FIG. 6 illustrates examples of simulated power savings using a worst case BSS Response time of 200 ms.

Assuming each access attempt results in the mobile station MS detecting a matching Immediate Assignment message within the first 200 ms of retransmission interval 1 TI-1, no power savings are realized by the mobile MS as shown in FIG. 7A.

Assuming each access attempt results in the mobile station MS detecting a matching Immediate Assignment message within the first 200 ms of retransmission interval 2 TI-2, the power savings realized using a matching procedure according to some embodiments disclosed herein are then 41040*[(109.8−41.9)+(41.9−41.9)]=41040*[67.9+0]=2786616 mWs≈774.1 mWh which is about 22.0% of the entire battery capacity as shown in FIG. 7A.

Assuming each access attempt results in the mobile station MS detecting a matching Immediate Assignment message within the first 200 ms of retransmission interval 3 TI-3, the power savings realized using a matching procedure according to some embodiments disclosed herein are then 41040*[(109.8−41.9)+(100.0−41.9)+(41.9−41.9)]=41040*[67.9+58.1+0]=5171040 mWs≈1436 mWh which is about 40.9% of the entire battery capacity as shown in FIG. 7A.

The table of FIG. 7A provides a summary of potential power savings using a matching procedure according to some embodiments disclosed herein with worst case BSS response times of 500 ms, 400 ms, 300 ms, and 200 ms. As shown, greater power savings can be achieved with shorter worst case BSS response times because durations of the response intervals (RI) over which mobile station MS looks (e.g., monitors, searches, etc.) for assignment messages is reduced. While no power savings are achieved when an Immediate Assignment message is received within the response interval RI of the first retransmission interval TI-1, increasing power savings can be achieved for each retransmission that is required.

Considering matching procedures according to embodiments disclosed herein versus legacy matching procedures, power savings can be provided as indicated in the table of FIG. 7A. A next step is to consider the case of a small data transmission (SDT) to determine if matching procedures according to embodiments disclosed herein provide power savings representing a significant portion of total power consumed during an SDT. A specific example of a small data transmission SDT is considered where a mobile station MS sends 660 octets of payload using 30 RLC (Radio Link Protocol) data blocks coded using CS-1 (Code Scheme 1);

A 200 ms worst case BSS response time is assumed where a mobile station MS detects a matching response 100 ms after transmitting an access request on the RACH (Random Access Channel);

The total number of non-BCCH (Broadcast Control Channel) blocks read (approximately) in the retransmission interval containing the matching response=(100/235)*9=3.83 where the number of AGCH matching attempts is therefore 3.83*0.6=2.3 (i.e., 60% of the non-BCCH radio blocks contain an Immediate Assignment message);

The total power consumed in sending one access request and detecting a matching response 100 ms later=3.83*5.2+2.3*0.052~20 mWs;

The total power consumed by a mobile station MS sending 30 CS-1 coded RLC data blocks=471.38 mWs (including power consumed monitoring DL (downlink) PACCH (Packet Associated Control Channel) and reading USF (Uplink State Flag) while sending the 30 RLC data blocks on the UL (UpLink) TBF (Temporary Block Flow)); and It is assumed that sending a same amount of user plane payload using fewer radio blocks (e.g. using MCS-7 or modulation and coding scheme 7) will scale down the power consumption in a linear manner.

If the mobile station MS detects a matching IA response within Retransmission interval 1 TI-1 after transmitting an initial access request, there is no significant difference between matching procedures according to embodiments disclosed herein and legacy matching procedures regarding power consumed for the entire SDT (i.e., access request+access response+payload transmission) as shown in FIG. 7B. If the mobile station MS detects a matching response 100 ms into Retransmission interval 2 TI-2, then the following apply:

The total power consumed using a legacy matching procedure can be 109.8 (from TI-1)+20.0 (from TI-2)+471.38 (transmission of 30 radio blocks)=601.18 mWs whereas the total power consumed using a matching procedure according to some embodiments disclosed herein can be 41.9+20.0+471.38=533.28 mWs. This translates into a 11.29% power savings per SDT using a matching procedure according to some embodiments disclosed herein as shown in FIG. 7B.

If the transmission of the 660 octet SDT user plane payload was instead made using MCS-7 (2*56=112 octets), then about 6 radio blocks would be transmitted→471.38 mWs/5=94.28 mWs. The total power consumed using a legacy matching procedure can be 109.8+20.0+94.28=224.08 mWs, whereas the total power consumed using a matching procedure according to some embodiments disclosed herein can be 41.9+20.0+94.28=156.18 mWs. This translates into a 30.3% power savings per SDT using a matching procedure according to some embodiments disclosed herein as shown in FIG. 7B.

Power saved using a matching procedure according to some embodiments disclosed herein can thus be significant compared to total amount of power consumed during transmission of user plane payload for a SDT, and therefore, matching procedures according to some embodiments disclosed herein can provide meaningful power savings.

A mobile station MS that enables a Matching Procedure according to embodiments disclosed herein may not experience significant impact on access success rate when reducing its matching time interval (i.e., its response interval RI) down to 100 ms for system loads consisting of a user arrival rate ranging from 10 to 20 users per second. Similarly, a mobile station MS that enables matching procedures according to embodiments disclosed herein may experience the same lack of impact on its Access Success Rate when reducing its lookback time down from that associated with legacy operations to 100 ms, while the Delay performance may be unaffected down to 200 ms (after which it may be only slightly impacted).

A reason that these performance metrics may remain substantially unaffected by a reduction in lookback time is due to a practical impact that radio conditions have on system access performance (e.g., RACH collisions can occur regardless of lookback time). The delay imposed by BSS queuing of access responses to be sent on the AGCH can vary somewhat according to BSS implementations, but this implementation specific variable may be quite dynamic, and in practice, can be seen as having a value less than 100 ms for a high percentage of loading conditions. In addition, the matching procedures according to some embodiments disclosed herein target power savings in the mobile station MS without addressing overload control since a legacy strategy for a mobile station MS resending a given access request up to Max. Retrans. (maximum number of retransmission M) is not significantly impacted. Stated in other words, matching procedures according to some embodiments disclosed herein only impact the duration of the time period that a mobile station MS looks (e.g., monitors, searches, etc.) for a matching response on the AGCH after sending/resending an access request on the RACH.

Some embodiments of inventive concepts will now be discussed in greater detail below with respect to FIGS. 10, 11, and 12.

As discussed above according to some embodiments, base station subsystem BSS determines system parameters (including S, T, M, and RT) that define mobile station MS operations to transmit/retransmit access requests and to look (e.g., monitor, search, etc.) for responsive assignment messages. More particularly, base station subsystem BSS determines a worst case or maximum response time that defines a period of time within which an assignment message will be transmitted responsive to an access request from mobile station MS. Accordingly, base station subsystem BSS transmits an indication of the worst case response time RT to mobile station MS, and mobile station MS uses the indication of the response time to determine a response interval RI over which mobile station MS should look (e.g., monitor, search, etc.) for a response to an access request, thereby reducing mobile station power consumption and/or processing overhead and/or increasing battery life.

Figure 10:
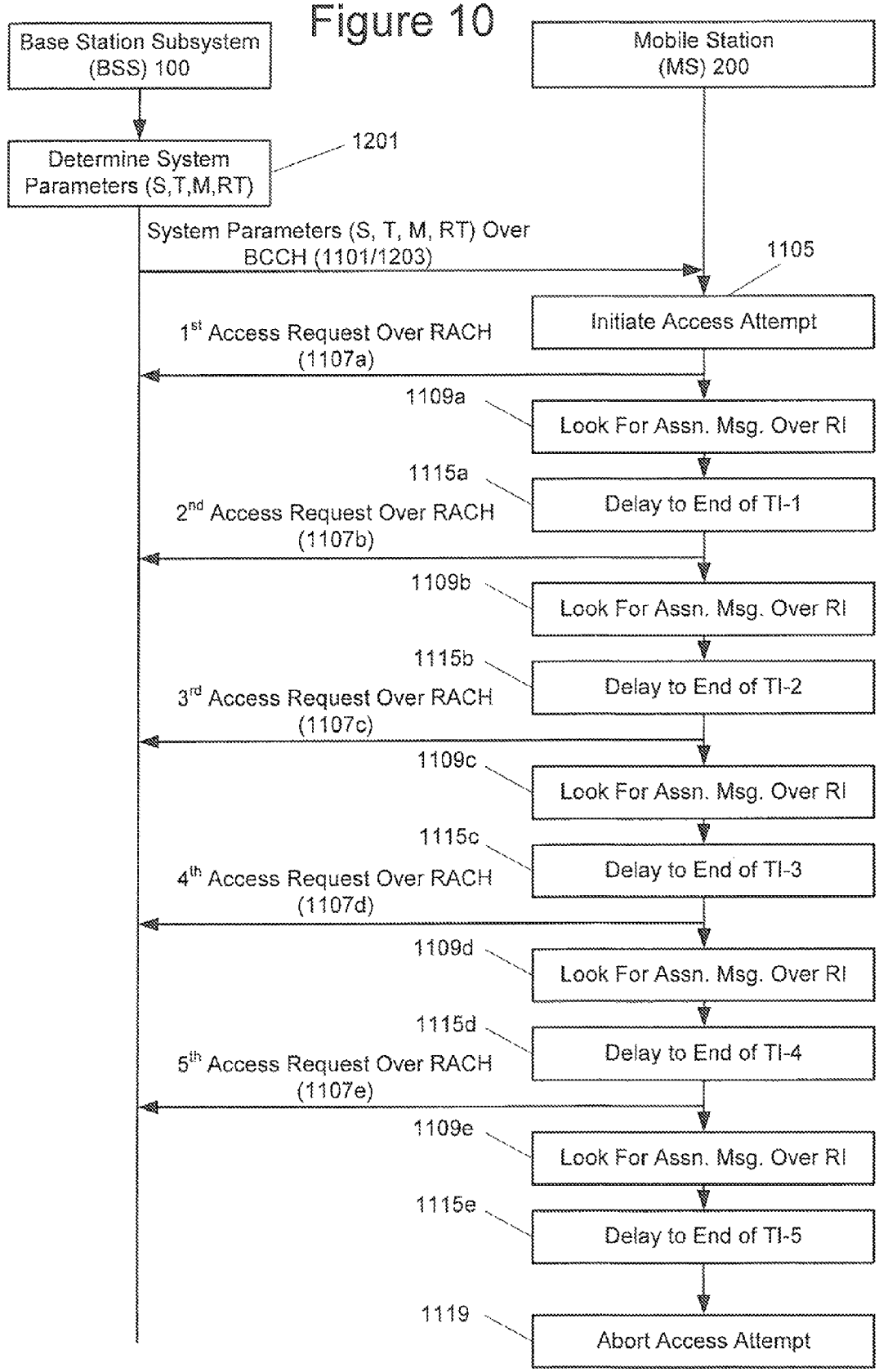
FIG. 10 is a signaling diagram illustrating signaling between a base station subsystem BSS and a mobile station MS according to some embodiments.
Figure 12:
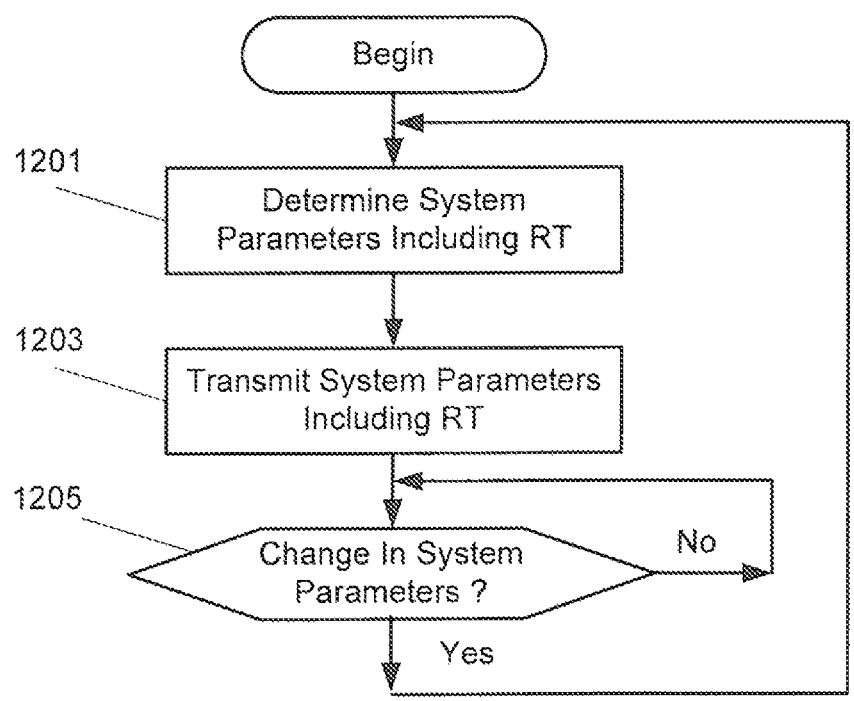
FIG. 12 is flow chart illustrating base station subsystem operations according to some embodiments.

As shown in FIGS. 10 and 12, base station subsystem processor 101 determines system parameters for mobile station MS access requests over a random access channel at block 1201. More particularly, base station subsystem processor 101 determines a response time (e.g., a worst case or maximum response time), wherein the response time defines a period within which an assignment message will be transmitted responsive to an access request received from the mobile station MS, and an indication of the response time RI is included as one of the system parameters. In addition, the system parameters can include S, T, and M as discussed above. At block 1203, base station subsystem processor 101 transmits (e.g., through transceiver 109 and antenna 117) the system parameters (including the indication of the response time RT) to the mobile station (MS), for example, over a broadcast control channel BCCH.

Moreover, base station subsystem processor 101 can dynamically determine the system parameters (e.g., including S, M, and RT) responsive to current communications traffic. Accordingly, the response time and corresponding indication RT can change responsive to changing traffic patterns, changing loads, different times of the day, etc. As shown at block 1205, when the system parameters change, base station subsystem processor 101 can repeat operations of determining and transmitting new system parameters at blocks 1201 and 1203.

Figure 11:
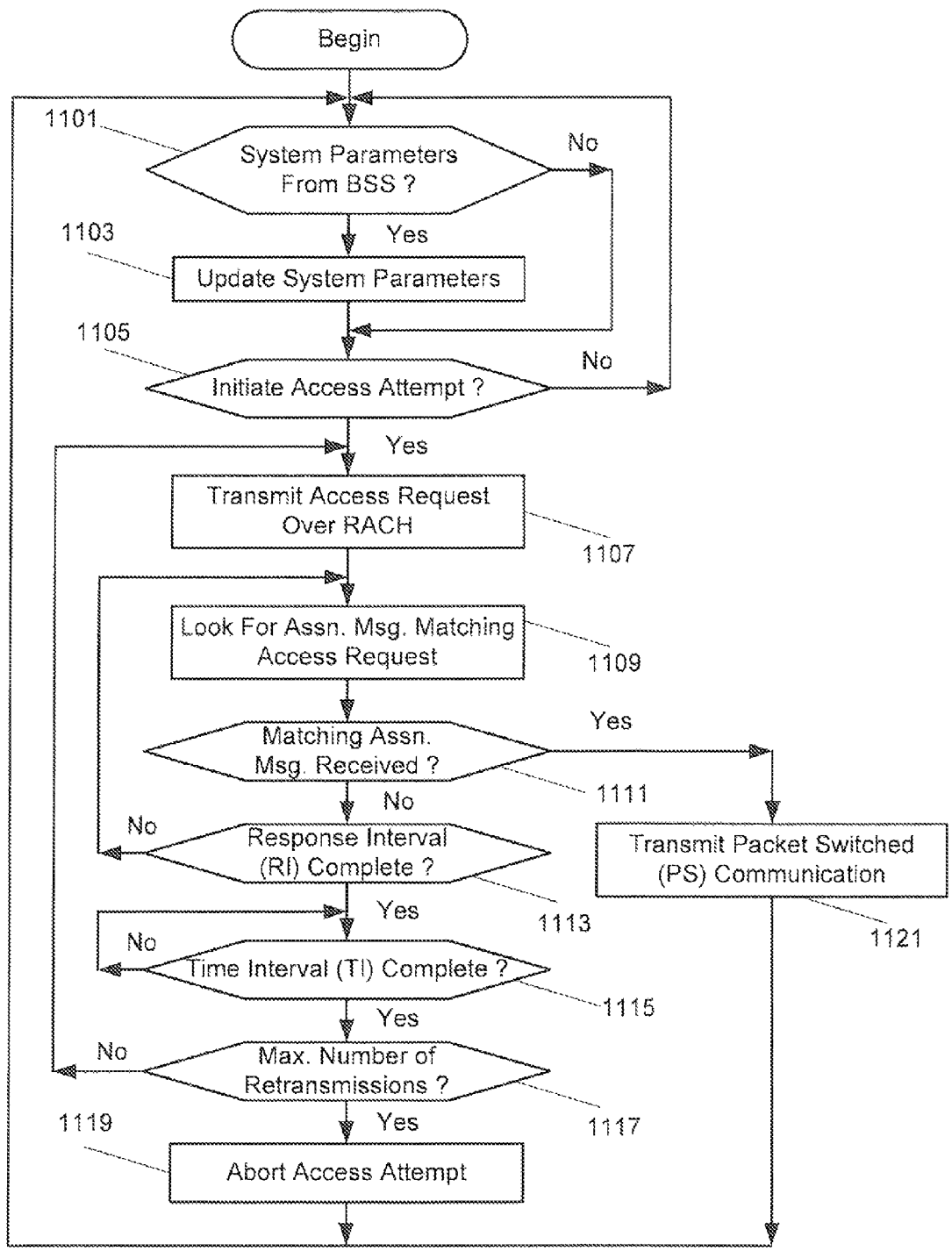
FIG. 11 is a flow chart illustrating mobile station operations according, to some embodiments.

When system parameters (e.g., S, T, M, and RT) are transmitted by base station subsystem BSS 100 over the broadcast control channel as discussed above with respect to FIGS. 10 and 12, mobile station processor 201 receives (through antenna 217 and transceiver 209) the system parameters at block 1101 of FIG. 11 (also shown as message 1101/1203 of FIG. 10), with the system parameters including the indication of a response time RT. As discussed above, a duration of the response interval RI is based on the indication of the response time RT received from the base station subsystem BSS, and more particularly, the indication of the response time RT can be an indication of a worst case response time. Upon receipt of system parameters, mobile station processor 201 updates the system parameters at block 1103.

At block 1105 of FIGS. 10 and 11, mobile station processor 201 determines if an access attempt should be initiated. An access attempt can be initiated, for example, when mobile station processor 201 determines that data is available for a packet switched PS transmission over an uplink to base station subsystem BSS. If an access attempt is initiated at block 1105 mobile station processor 201 transmits one or a plurality of access requests as discussed below. In the example discussed below, up to five access requests are transmitted by mobile station MS (i.e., one initial access request and four retransmissions of the access request in accordance with the system parameter M equal to four 4) during an access attempt before aborting the access attempt if no matching assignment message is received.

Operations of mobile station MS and base station subsystem BSS according to some embodiments disclosed herein will now be discussed with reference to FIGS. 10, 11, and 12.

Responsive to initiating an access attempt at block 1105, mobile station processor 201 transmits a first/initial access request (through transceiver 209 and antenna 217) over the random access channel RACH to base station subsystem BSS at block 1107 of FIG. 11 (also indicated by message 1107a of FIG. 10). More particularly, mobile station processor 201 transmits the first access request at time Ti as shown in FIG. 2, with the first access request being a first packet channel request (e.g., an EPCR) message. After transmitting the first access request, mobile station processor 201 looks (e.g., monitors, searches, etc.) for an assignment message matching the first access request received from the base station subsystem BSS (through antenna 217 and transceiver 209) during the response interval RI at block 1109 (also shown as block 1109a of FIG. 10). Moreover, the first access request includes an identifying bit sequence that is unique relative to other access requests transmitted by mobile station processor 201 during the access attempt.

If an assignment message matching the first access request (e.g., having an identifying bit sequence matching the identifying bit sequence of the first access request) is received by the mobile station processor 201 (through antenna 217 and transceiver 209) during the first response interval RI at blocks 1109 (also shown as block 1109a of FIG. 10), 1111, and/or 1113, mobile station processor 201 transmits (through transceiver 209 and antenna 217) a packet switched PS communication to the base station subsystem BSS responsive to receiving the assignment message at block 1121. Because the access attempt has resulted in an uplink assignment subsequent access requests are not needed until another access attempt is initiated at block 1105. If an assignment message matching the first access request is not received by the mobile station processor 201 (through antenna 217 and transceiver 209) before expiration of the first response interval RI at blocks 1109 also shown as block 1109a of FIG. 10), 1111, and/or 1113, mobile station processor 201 continues to wait until expiration/completion of retransmission interval TI-1 at block 1115 of FIG. 11 (also shown at block 1115a of FIG. 10) before transmitting a next access request.

As discussed above with respect to FIG. 2, retransmission interval TI-1 can be defined by system parameters (e.g., S and T), and retransmission interval TI-1 is longer than response interval RI. Accordingly, mobile station power consumption and/or processing overhead may be reduced and/or mobile station battery life may be increased by terminating looking monitoring, searching, etc.) for an assignment message matching the first access request after expiration of response interval RI. Accordingly, mobile station processor 201 will wait at block 1115 of FIG. 11 (also indicated by block 1115*a* of FIG. 10) without monitoring for an assignment message matching the first access request between expiration of the first response interval RI and transmitting a second access request after expiration of retransmission interval TI-1.

Responsive to failure receiving an assignment message matching the first access request during the first response interval RI at blocks 1109/1109*a*, 1111, and 1113, and responsive to expiration of retransmission interval TI-1 at block 1115/1115*a*, mobile station processor 201 transmits a second access request for the access attempt (through transceiver 209 and antenna 217) over the random access channel RACH to base station subsystem BSS at block 1107 of FIG. 11 (also indicated by message 1107*b* of FIG. 10). The second access request may also be referred to as a first retransmission of the access request for the access attempt. More particularly, mobile station processor 201 transmits the second access request at time Ta as shown in FIG. 2, with the second access request being a second packet channel request (e.g., an EPCR) message. After transmitting the second access request, mobile station processor 201 looks (e.g., monitors, searches, etc.) for an assignment message matching the second access request received from the base station subsystem BSS (through antenna 217 and transceiver 209) during the second response interval RI at block 1109 (also shown as block 1109*b* of FIG. 10). Moreover, the second access request includes an identifying bit sequence that is unique relative to other access requests transmitted by mobile station processor 201 during the access attempt. More particularly, the indentifying bit sequences for the first and second access requests are different.

If an assignment message matching the second access request (e.g., having an identifying bit sequence matching the identifying bit sequence of the second access request) is received by the mobile station processor 201 (through antenna 217 and transceiver 209) during the second response interval RI at blocks 1109 (also shown as block 1109*b* of FIG. 10), 1111, and/or 1113, mobile station processor 201 transmits (through transceiver 209 and antenna 217) a packet switched PS communication to the base station subsystem BSS responsive to receiving the assignment message at block 1121. Because the access attempt has resulted in an uplink assignment subsequent access requests are not needed until another access attempt is initiated at block 1105. If an assignment message matching the second access request is not received by the mobile station processor 201 (through antenna 217 and transceiver 209) before expiration of the second response interval RI at blocks 1109 (also shown as block 1109*b* of FIG. 10), 1111, and/or 1113, mobile station processor 201 continues to wait until expiration/completion of retransmission interval TI-2 at block 1115 of FIG. 11 (also shown at block 1115*b* of FIG. 10) before transmitting to next access request.

As discussed above with respect to FIG. 2, retransmission interval TI-2 can be defined by system parameters (e.g., S and T), and retransmission interval TI-2 is longer than response interval RI. Accordingly, mobile station power consumption and/or processing overhead may be reduced and/or mobile station battery life may be increased by terminating looking (e.g., monitoring, searching, etc.) for an assignment message matching the second access request after expiration of response interval RI. Accordingly, mobile station processor 201 will wait at block 1115 of FIG. 11 (also indicated by block 1115*b* of FIG. 10) without monitoring for an assignment message matching the second access request (or the first access request) between expiration of the second response interval RI and transmitting a third access request after expiration of retransmission interval TI-2.

Because the first and second access request include different identifying bit sequences, mobile station processor 201 can look (e.g., monitor, search, etc.) for an assignment message matching only the second access request during the second response interval RI (e.g., at block 1109*b* of FIG. 10) without monitoring for an assignment message matching the first access request.

Responsive to failure receiving an assignment message matching the second access request during the second response interval RI at blocks 1109/1109*b*, 1111, and 1113, and responsive to expiration of retransmission interval TI-2 at block 1115/1115*b*, mobile station processor 201 transmits a third access request for the access attempt (through transceiver 209 and antenna 217) over the random access channel RACH to base station subsystem BSS at block 1107 of FIG. 11 (also indicated by message 1107*c* of FIG. 10). The third access request may also be referred to as a second retransmission of the access request for the access attempt. More particularly, mobile station processor 201 transmits the third access request at time Tb as shown in FIG. 2, with the third access request being a third packet channel request (e.g., an EPCR) message. After transmitting the third access request, mobile station processor 201 looks (e.g., monitors, searches, etc) for an assignment message matching the third access request received from the base station subsystem BSS (through antenna 217 and transceiver 209) during the third response interval RI at block 1109 of FIG. 11 (also shown as block 1109*c* of FIG. 10). Moreover, the third access request includes an identifying bit sequence that is unique relative to other access requests transmitted by mobile station processor 201 during the access attempt. More particularly, the indentifying bit sequence for the third access request is different than identifying bit sequences for either of the first and second access requests.

If an assignment message matching the third access request (e.g., having an identifying bit sequence matching the identifying bit sequence of the third access request) is received by the mobile station processor 201 (through antenna 217 and transceiver 209) during the third response interval RI at blocks 1109/1109*c*, 1111, and/or 1113, mobile station processor 201 transmits (through transceiver 209 and antenna 217) a packet switched PS communication to the base station subsystem BSS responsive to receiving the assignment message at block 1121. Because the access attempt has resulted in an uplink assignment, subsequent access requests are not needed until another access attempt is initiated at block 1105. If an assignment message matching the third access request is not received by the mobile station processor 201 (through antenna 217 and transceiver 209) before expiration of the third response interval RI at blocks 1109/1109*c*, 1111, and/or 1113, mobile station processor 201 continues to wait until expiration/completion of retransmission interval TI-3 at block 1115 of FIG. 11 (also shown at block 1115*c* of FIG. 10) before transmitting a next access request.

As discussed above with respect to FIG. 2, retransmission interval TI-3 can be defined by system parameters (e.g., S and T), and retransmission interval TI-3 is longer than response interval RI. Accordingly, mobile station power consumption and/or processing overhead may be reduced and/or mobile station battery life may be increased by terminating looking (e.g., monitoring, searching, etc.) for an assignment message matching the third access request after expiration of response interval RI. Accordingly, mobile station processor 201 will wait at block 1115 of FIG. 11 also indicated by block 1115c of FIG. 10) without monitoring for an assignment message matching the third access request (or any of the previous two access requests) between expiration of the third response interval RI and transmitting a fourth access request after expiration of retransmission interval TI-3.

Because the first, second, and third access requests include different identifying bit sequences, mobile station processor 201 can look (e.g., monitor, search, etc.) for an assignment message matching only the third access request during the third response interval RI (e.g., at block 1109c of FIG. 10) without monitoring for an assignment message matching either of the first and/or second access requests.

Responsive to failure receiving an assignment message matching the third access request during the third response interval RI at blocks 1109/1109c, 1111 and 1113, and responsive to expiration of retransmission interval TI-3 at block 1115/1115c, mobile station processor 201 transmits a fourth access request for the access attempt (through transceiver 209 and antenna 217) over the random access channel RACH to base station subsystem BSS at block 1107 of FIG. 11 (also indicated by message 1107d of FIG. 10). The fourth access request may also be referred to as a third retransmission of the access request for the access attempt. More particularly, mobile station processor 201 transmits the fourth access request at time Tc as shown in FIG. 2, with the fourth access request being a fourth packet channel request (e.g., an EPCR) message. After transmitting the fourth access request, mobile station processor 201 looks (e.g., monitors, searches, etc.) for an assignment message matching the fourth access request received from the base station subsystem BSS (through antenna 217 and transceiver 209) during the fourth response interval RI at block 1109 of FIG. 11 (also shown as block 1109d of FIG. 10). Moreover, the fourth access request includes an identifying bit sequence that is unique relative to other access requests transmitted by mobile station processor 201 during the access attempt. More particularly, the indentifying bit sequence for the fourth access request is different than identifying bit sequences for any of the first, second, and third access requests.

If an assignment message matching the fourth access request (e.g., having an identifying bit sequence matching the identifying bit sequence of the fourth access request) is received by the mobile station processor 201 (through antenna 217 and transceiver 209) during, the fourth response interval RI at blocks 11091109d, 1111 and/or 1113, mobile station processor 201 transmits (through transceiver 209 and antenna 217) a packet switched PS communication to the base station subsystem BSS responsive to receiving the assignment message at block 1121. Because the access attempt has resulted in an uplink assignment, subsequent access requests are not needed until another access attempt is initiated at block 1105. If an assignment message matching the fourth access request is not received by the mobile station processor 201 (through antenna 217 and transceiver 209) before expiration of the fourth response interval RI at blocks 1109/1109d, 1111, and/or 1113, mobile station processor 201 continues to wait until expiration/completion of retransmission interval TI-4 at block 1115 of FIG. 11 (also shown at block 1115d of FIG. 10) before transmitting a next access request.

As discussed above with respect to FIG. 2, retransmission interval TI-4 can be defined by system parameters (e.g., S and T), and retransmission interval TI-4 is longer than response interval RI. Accordingly, mobile station power consumption and/or processing overhead may be reduced and/or mobile station battery life may be increased by terminating looking (e.g., monitoring, searching, etc.) for an assignment message matching the fourth access request after expiration of response interval RI. Accordingly, mobile station processor 201 will wait at block 1115 of FIG. 11 also indicated by block 1115d of FIG. 10) without monitoring for an assignment message matching the fourth access request (or any of the previous three access requests) between expiration of the fourth response interval RI and transmitting a fifth access request after expiration of retransmission interval TI-4.

Because the first, second, third, and fourth access requests include different identifying bit sequences, mobile station processor 201 can look (e.g., monitor, search, etc.) for an assignment message matching only the fourth access request during the fourth response interval RI (e.g., at block 1109d of FIG. 10) without monitoring for an assignment message matching any of the first, second, or third access requests.

Responsive to failure receiving an assignment message matching the fourth access request during the fourth response interval RI at blocks 1109/1109d, 1111, and 1113, and responsive to expiration of retransmission interval TI-4 at block 1115/1115d, mobile station processor 201 transmits a fifth access request for the access attempt (through transceiver 209 and antenna 217) over the random access channel RACH to base station subsystem BSS at block 1107 of FIG. 11 (also indicated by message 1107e of FIG. 10). The fifth access request may also be referred to as a fourth retransmission of the access request for the access attempt. More particularly, mobile station processor 201 transmits the fifth access request at time Td as shown in FIG. 2, with the fifth access request being a fifth packet channel request (e.g., an EPCR) message. After transmitting the fifth access request, mobile station processor 201 looks (e.g., monitors, searches, etc.) for an assignment message matching the fifth access request received from the base station subsystem BSS (through antenna 217 and transceiver 209) during the fifth response interval RI at block 1109 of FIG. 11 (also shown as block 1109e of FIG. 10). Moreover, the fifth access request includes an identifying bit sequence that is unique relative to other access requests transmitted by mobile station processor 201 during the access attempt. More particularly, the indentifying bit sequence for the fifth access request is different than identifying bit sequences for any of the first, second, third, and fourth access requests.

If an assignment message matching the fifth access request (e.g., having an identifying bit sequence matching the identifying bit sequence of the fifth access request) is received by the mobile station processor 201 (through antenna 217 and transceiver 209) during the fifth response interval RI at blocks 1109/1109e, 1111, and/or 1113, mobile station processor 201 transmits (through transceiver 209 and antenna 217) a packet switched PS communication to the base station subsystem BSS responsive to receiving the assignment message at block 1121. Because the access attempt has resulted in an uplink assignment, subsequent access requests are not needed until another access attempt is initiated at block 1105. If an assignment message matching, the fifth access request is not received by the mobile station processor 201 (through antenna 217 and transceiver 209) before expiration of the fifth response interval RI at blocks 1109/1109e, 1111, and/or 1113, mobile station processor 201 continues to wait until expiration/completion of retransmission interval TI-5 at block 1115 of FIG. 11 (also shown at block 1115e of FIG. 10) before aborting the access attempt at block 119.

As discussed above with respect to FIG. 2, retransmission interval TI-5 can be defined by system parameters (e.g., S and T), and retransmission interval TI-5 is longer than response interval RI. Accordingly, mobile station power consumption and/or processing overhead may be reduced and/or mobile station battery life may be increased by terminating looking (e.g., monitoring, searching, etc.) for an assignment message matching the fifth access request after expiration of response interval RI. Accordingly, mobile station processor 201 will wait at block 1115 of FIG. 11 (also indicated by block 1115e of FIG. 10) without monitoring for an assignment message matching the fifth access request (or any of the previous four access requests) between expiration of the fifth response interval RI and aborting the access attempt after expiration of retransmission interval TI-5.

Because the first, second, third, fourth, and fifth access requests include different identifying bit sequences, mobile station processor 201 can look (e.g., monitor, search, etc.) for an assignment message matching only the fifth access request during the fifth response interval RI (e.g., at block 1109e of FIG. 10) without monitoring for an assignment message matching any of the first, second, third, or fourth access requests.

Operations of blocks 1107, 1109, 1111, 1113, and 1115 are thus be repeated for a same access attempt until a maximum number of access requests have been transmitted/retransmitted, and the maximum number of access requests can be defined by the system parameter M that is broadcast by the base station subsystem BBS. According to some embodiments disclosed herein, up to five access requests for four retransmissions) can be allowed at block 1117 before aborting an access attempt, but fewer or more access requests may be allowed, for example depending on system parameters broadcast by base station subsystem BSS. According to some embodiments disclosed herein, the response interval RI for each access request of an access attempt can have a same duration as shown in FIG. 2.

In the above-description of various embodiments of present inventive concepts, it is to be understood that the terminology used herein is for the purpose of describing particular embodiments only and is not intended to be limiting of the inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising" "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions can be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions can also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium can include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and as portable digital video disc read-only memory (DVD/BlueRay).

The computer program instructions can also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of present inventive concepts can be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks can occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of present inventive concepts. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of present inventive concepts. All such variations and modifications are intended to be included herein within the scope of present inventive concepts. Accordingly, the above disclosed subject matter is to be considered illustrative, and not restrictive, and the appended claims are intended to cover all such modifications, enhancements, and other embodiments, which fall within the spirit and scope of present inventive concepts.

That which is claimed is:

1. A method of operating a mobile station requesting uplink access from a base station subsystem, the method comprising:
   transmitting a first uplink access request from the mobile station over an uplink to the base station subsystem;
   during a response interval after transmitting the first uplink access request, looking for an assignment message transmitted over a downlink from the base station subsystem and matching the first uplink access request; and
   transmitting a second uplink access request from the mobile station over an uplink to the base station subsystem after expiration of a retransmission interval after transmitting the first uplink access request, wherein the retransmission interval is longer than the response interval;
   wherein looking for an assignment message transmitted over the downlink and matching the first uplink access request is terminated after expiration of the response interval and before expiration of the retransmission interval.

2. The method of claim 1 wherein the response interval comprises a first response interval and wherein the retransmission interval comprises a first retransmission interval, the method further comprising:
   during a second response interval after transmitting the second uplink access request, looking for an assignment message transmitted over a downlink from the base station subsystem and matching the second uplink access request; and
   transmitting a third uplink access request to the base station subsystem after expiration of a second retransmission interval after transmitting the second uplink access request, wherein the second retransmission interval is longer than the second response interval.

3. The method of claim 2 wherein looking for an assignment message during the second response interval after transmitting the second uplink access request comprises looking for an assignment message matching only the second uplink access request.

4. The method of claim 2 wherein the first uplink access request includes a first bit sequence, wherein the second uplink access request includes a second bit sequence different than the first bit sequence, and wherein looking for an assignment message during the second response interval after transmitting the second uplink access request comprises looking for an assignment message matching the second bit sequence of the second uplink access request without looking for an assignment message matching the first bit sequence.

5. The method of claim 2 wherein the first and second response intervals have a same duration.

6. The method of claim 1 further comprising:
   before transmitting the first uplink access request, receiving an indication of a response time from the base station subsystem, wherein a duration of the response interval is based on the indication of the response time received from the base station subsystem.

7. The method of claim 6 wherein the indication of the response time comprises an indication of a worst case response time.

8. The method of claim 1 wherein transmitting the first and second uplink access requests comprises transmitting the first and second uplink access requests on a random access channel from the mobile station to the base station subsystem.

9. The method of claim 1 wherein the first uplink access request comprises a first packet channel request message, and wherein the second uplink access request comprises a second packet channel request message.

10. The method of claim 1 wherein transmitting the second uplink access request comprises transmitting the second uplink access request from the mobile station to the base station subsystem responsive to failure to receive an assignment message matching the first uplink access request during the response interval, the method further comprising:
   receiving an assignment message from the base station subsystem matching the second uplink access request after transmitting the second uplink access request; and transmitting a packet switched communication from the mobile station to the base station subsystem responsive to receiving the assignment message.

11. The method of claim 1 wherein transmitting the second uplink access request comprises transmitting the second uplink access request responsive to failure to receive an assignment message matching the first uplink access request during the response interval.

12. The method of claim 1 wherein the response interval comprises a first response interval, wherein transmitting the second uplink access request comprises transmitting the second uplink access request responsive to failure to receive an assignment message matching the first uplink access request during the first response interval, the method further comprising:
during a second response interval after transmitting the second uplink access request, looking for an assignment message transmitted from the base station subsystem and matching only the second uplink access request.

13. The method of claim 12 wherein looking for an assignment message matching the first uplink access request comprises looking for an assignment message matching the first uplink access request only during the first response interval, wherein transmitting the second uplink access request comprises transmitting the second uplink access request after expiration of a retransmission interval after transmitting the first uplink access request, wherein the retransmission interval is longer than the first response interval.

14. The method of claim 12 further comprising:
transmitting a third uplink access request from the mobile station to the base station subsystem responsive to failure to receive an assignment message matching the second uplink access request during the second response interval.

15. The method of claim 1 wherein the response interval defines a first period of time between transmitting the first uplink access request and transmitting the second uplink access request, wherein the retransmission interval defines a second period of time between transmitting the first uplink access request and transmitting the second uplink access request, and wherein the second period of time is longer than the first period of time.

16. The method of claim 1 wherein looking for an assignment message includes looking for an assignment message for an uplink resource.

17. The method of claim 1 wherein a duration of the response interval after transmitting the first uplink access request is greater than a duration of a Time Division Multiple Access (TDMA) frame.

18. A mobile station comprising:
a transceiver configured to provide wireless communication with a base station subsystem of a radio access network; and
a processor coupled to the transceiver, wherein the processor is configured to transmit a first uplink access request through the transceiver over an uplink to the base station subsystem, to look for an assignment message transmitted over a downlink from the base station subsystem and matching the first uplink access request during a response interval after transmitting the first uplink access request, to terminate looking for an assignment message transmitted over the downlink and matching the first uplink access request after expiration of the response interval and before expiration of a retransmission interval; and to transmit a second uplink access request through the transceiver over an uplink to the base station subsystem after expiration of the retransmission interval after transmitting the first uplink access request, wherein the retransmission interval is longer than the response interval.

19. The mobile station of claim 18 wherein the response interval comprises a first response interval, wherein the retransmission interval comprises a first retransmission interval, and wherein the processor is further configured to look for an assignment message transmitted from the base station subsystem and matching the second uplink access request during a second response interval after transmitting the second uplink access request, and to transmit a third uplink access request through the transceiver to the base station subsystem after expiration of a second retransmission interval after transmitting the second uplink access request, wherein the second retransmission interval is longer than the second response interval.

20. The mobile station of claim 18 wherein the response interval defines a first period of time between transmitting the first uplink access request and transmitting the second uplink access request, wherein the retransmission interval defines a second period of time between transmitting the first uplink access request and transmitting the second uplink access request, and wherein the second period of time is longer than the first period of time.

21. The mobile station of claim 18 wherein the assignment message is an assignment message for an uplink resource.

22. A method of operating a base station subsystem communicating with a mobile station, the method comprising:
determining a response time defining a period within which an assignment message will be transmitted over a downlink from the base station subsystem to the mobile station responsive to an uplink access request received from the mobile station; and
transmitting an indication of the response time over a downlink from the base station subsystem to the mobile station, wherein the response time defines the period within which an assignment message will be transmitted over a downlink responsive to an uplink access request.

23. The method of claim 22 wherein the response time comprises an indication of a worst case response time.

24. The method of claim 22 wherein transmitting the indication of the response time comprises transmitting the indication of the response time on a broadcast control channel.

25. The method of claim 22 wherein determining the response time comprises determining the response time responsive to current communications traffic.

26. The method of claim 22 wherein the uplink access request is a first uplink access request, wherein a retransmission interval defines a period of time after the mobile station transmits the first uplink access request before the mobile station will transmit a second uplink access request, and wherein the retransmission interval is longer than the response time.

27. The method of claim 22 wherein the assignment message is an assignment message for an uplink resource.

28. The method of claim 22 wherein a duration of the response time is greater than a duration of a Time Division Multiple Access (TDMA) frame.

29. A base station subsystem in a radio access network, the base station subsystem comprising:

a transceiver configured to provide wireless communication with a mobile station; and a processor coupled to the transceiver, wherein the processor is configured to determine a response time defining a period within which an assignment message will be transmitted from the base station subsystem over a downlink to the mobile station responsive to an uplink access request received from the mobile station over an uplink, and to transmit an indication of the response time through the transceiver over a downlink to the mobile station, wherein the response time defines the period within which an assignment message will be transmitted over a downlink responsive to an uplink access request.

30. The base station subsystem of claim 29 wherein the response time comprises an indication of a worst case response time.

31. The base station subsystem of claim 29 wherein the processor is configured to transmit the indication of the response time through the transceiver on a broadcast control channel.

32. The base station subsystem of claim 29 wherein the processor is configured to determine the response time responsive to current communications traffic.

33. The base station subsystem of claim 29 wherein the uplink access request is a first uplink access request, wherein a retransmission interval defines a period of time after the mobile station transmits the first uplink access request before the mobile station will transmit a second uplink access request, and wherein the retransmission interval is longer than the response time.

34. The base station subsystem of claim 29 wherein the assignment message is an assignment message for an uplink resource.

* * * * *